US008914575B2

(12) United States Patent
Nelson et al.

(10) Patent No.: US 8,914,575 B2
(45) Date of Patent: *Dec. 16, 2014

(54) SCSI PROTOCOL EMULATION FOR VIRTUAL STORAGE DEVICE STORED ON NAS DEVICE

(71) Applicant: VMware, Inc., Palo Alto, CA (US)

(72) Inventors: Michael Nelson, Alamo, CA (US); Hao Xu, Sunnyvale, CA (US); Daniel J. Scales, Mountain View, CA (US); Matthew B. Amdur, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/894,090

(22) Filed: May 14, 2013

(65) Prior Publication Data
US 2013/0254505 A1  Sep. 26, 2013

Related U.S. Application Data

(63) Continuation of application No. 13/430,468, filed on Mar. 26, 2012, now Pat. No. 8,443,139, which is a continuation of application No. 12/959,930, filed on Dec. 3, 2010, now Pat. No. 8,145,836, which is a continuation of application No. 11/707,359, filed on Feb. 16, 2007, now Pat. No. 7,865,663.

(51) Int. Cl.
*G06F 13/00* (2006.01)
*G06F 13/28* (2006.01)
*G06F 12/14* (2006.01)
*G06F 13/42* (2006.01)

(52) U.S. Cl.
CPC .............. *G06F 12/145* (2013.01); *G06F 13/42* (2013.01); *G06F 2213/0028* (2013.01); *G06F 2213/0058* (2013.01)
USPC ................... 711/112; 711/154; 711/E12.014; 718/1

(58) Field of Classification Search
CPC .......... G06F 17/30171; G06F 17/3007; G06F 12/1416; G06F 12/1425; G06F 2213/0058
USPC ........................ 711/112, 154, E12.014; 718/1
See application file for complete search history.

(56) References Cited

U.S. PATENT DOCUMENTS

| 7,313,557 | B1 * | 12/2007 | Noveck ................................. 1/1 |
| 7,584,279 | B1 | 9/2009 | Chapman |
| 7,844,584 | B1 * | 11/2010 | Griess ........................... 707/704 |
| 7,865,663 | B1 | 1/2011 | Nelson et al. |
| 8,145,836 | B2 | 3/2012 | Nelson et al. |
| 8,443,139 | B2 * | 5/2013 | Nelson et al. .................. 711/112 |
| 2004/0030668 | A1 * | 2/2004 | Pawlowski et al. ............... 707/1 |
| 2004/0139196 | A1 | 7/2004 | Butler et al. |
| 2006/0248047 | A1 | 11/2006 | Grier et al. |
| 2007/0255897 | A1 | 11/2007 | McNutt |
| 2008/0086725 | A1 | 4/2008 | Boss et al. |

* cited by examiner

*Primary Examiner* — Edward Dudek, Jr.

(57) ABSTRACT

A virtualization technique, in accordance with one embodiment of the present invention, includes emulating the small computing system interface (SCSI) protocol to access a virtual SCSI storage device backed by a file stored on network attached storage (NAS).

17 Claims, 9 Drawing Sheets

US 8,914,575 B2

SCSI PROTOCOL EMULATION FOR VIRTUAL STORAGE DEVICE STORED ON NAS DEVICE

CROSS REFERENCE TO RELATED APPLICATIONS

This application is a continuation of and claims the benefit of U.S. patent application Ser. No. 13/430,468 (U.S. Pat. No. 8,443,139) entitled "SCSI Protocol Emulation for Virtual Storage Device Stored on NAS Device" and filed on Mar. 26, 2012; which is a continuation of and claims the benefit of U.S. patent application Ser. No. 12/959,930 (U.S. Pat. No. 8,145, 836) entitled "SCSI Protocol Emulation for Virtual Storage Device Stored on NAS Device" and filed on Dec. 3, 2010; which is a continuation of and claims the benefit of U.S. patent application Ser. No. 11/707,359 (U.S. Pat. No. 7,865, 663) entitled "SCSI Protocol Emulation for Virtual Storage Device Stored on NAS Device" and filed on Feb. 16, 2007, all of which are hereby incorporated by reference.

BACKGROUND OF THE INVENTION

Computing devices have made significant contributions toward the advancement of modern society and are utilized in a number of applications to achieve advantageous results. Numerous devices, such as personal computers, laptop computers, servers, minicomputers, mainframe computers, workstations, and distributed computer systems, have facilitated increased productivity and reduced costs in analyzing and communicating data in most areas of business, science, education and entertainment. As computing devices continue to progress one technique for achieving increased performance is virtualization.

The advantages of virtual machine technology have become widely recognized. Among these advantages is the ability to run multiple virtual machines on a single host platform. Running multiple virtual machines makes better use of the capacity of the hardware, while still ensuring that each user enjoys the features of a "complete" computer. Depending on how it is implemented, virtualization can also provide increased security, since the virtualization can isolate potentially unstable or unsafe software so that it cannot adversely affect the hardware state or system files required for running the physical (as opposed to virtual) machine.

A virtualization of a physical computing device typically creates a uniform hardware image, implemented in software, on which operating systems and applications run. The virtualization architecture may provide management and provisioning of virtual machines, continuous workload consolidation across physical computing devices and mobility of virtual machines between physical computing devices. Each virtual machine is a software representation of a physical machine that can run or host a guest operating system and one or more applications.

Virtualization provides a layer of abstraction between the physical computing, storage and networking hardware and the operating system(s) and applications running on the computing device. Virtualization may be implemented by a hosted architecture or a non-hosted architecture. Virtualization terminology has evolved over time and has not yet become fully standardized. Nonetheless, for purposes of this patent, a virtualization system implementing a non-hosted architecture is referred to as a "hypervisor" implementation.

A hosted approach provides partitioning and other virtualization services with the assistance of a standard operating system and typically supports a broad range of hardware configurations. The virtualization software relies on the host operating system to provide some of the services to talk directly to the underlying hardware.

In a hypervisor implementation, the hypervisor is the lowest layer of software installed on a physical computing device (e.g., x86-based computing system). In a typical hypervisor architecture, a thin layer of software that implements partitioning and other lower-level virtualization capabilities runs directly on hardware, but underneath the software that implements higher-level virtualization services.

Referring to FIG. 1, one possible arrangement of a computer system 100 that implements virtualization, according to the conventional art, is shown. One or more virtual machines (VMs) or "guests" 102, 104 are installed on a "host platform," or simply "host," which will include system hardware, that is, a hardware platform 106, and one or more layers or co-resident components comprising system-level software, such as an operating system or similar kernel, a virtual machine monitor or hypervisor (see below), or some combination of these. The system hardware typically includes one or more processors 108, memory 110, some form of mass storage 112, and various other devices 114.

Each VM 102 will typically have both virtual machine hardware 118 and guest system software 116. The virtual machine hardware 118 typically includes at least one virtual CPU 120-124, virtual memory 126, at least one virtual disk 128, and one or more virtual devices 130. Note that a disk—virtual or physical—is also a "device," but is usually considered separately because of the important role of the disk. All of the virtual hardware components of the VM may be implemented in software using known techniques to emulate the corresponding physical components. The guest system software 116 includes a guest operating system (OS) 132 and drivers 134 as needed for the various virtual devices 130.

Note that a single VM 102 may be configured with more than one virtualized processor 120-124. To permit computer systems to scale to larger numbers of concurrent threads, systems with multiple CPUs 108 have been developed. These symmetric multi-processor (SMP) systems are available as extensions of the PC platform and from other vendors. Essentially, an SMP system is a hardware platform that connects multiple processors to a shared main memory and shared input/output (I/O) devices. Virtual machines may also be configured as SMP VMs. FIG. 1, for example, illustrates multiple virtual processors (VCPU0, VCPU1, . . . , VCPUm) within the VM 102.

Yet another configuration is found in a so-called "multi-core" architecture, in which more than one physical CPU 108 is fabricated on a single chip, with its own set of functional units (such as a floating-point unit and an arithmetic/logic unit ALU), and can execute threads independently; multi-core processors typically share only very limited resources, such as some cache. Still another technique that provides for simultaneous execution of multiple threads is referred to as "simultaneous multi-threading," in which more than one logical CPU (hardware thread) operates simultaneously on a single chip, but in which the logical CPUs flexibly share some resource such as caches, buffers, functional units, etc. This invention may be used regardless of the type—physical and/or logical—or number of processors included in a physical machine and/or VM.

If the VM 102 is properly designed, applications 134 running on the VM 102 will function as they would if run on a "real" computer, even though the applications are running at least partially indirectly, that is via the guest OS 132 and virtual processor(s) 120-124. Executable files will be accessed by the guest OS 132 from the virtual disk 128 or virtual memory 126, which will be portions of the actual physical disk 112 or memory 110 allocated to that VM 102. Once an application is installed within the VM 102, the guest OS 132 retrieves files from the virtual disk 128 just as if the files had been pre-stored as the result of a conventional installation of the application. The design and operation of virtual machines 102 are well known in the field of computer science.

Some interface is generally required between the guest software within a VM 102 and the various hardware components and devices in the underlying hardware platform. This interface—which may be referred to generally as "virtualization software"—may include one or more software components and/or layers, possibly including one or more of the software components known in the field of virtual machine technology as "virtual machine monitors" (VMMs) 136, 138, "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs may be included in the host OS itself. Unless otherwise indicated, the invention described below may be used in virtualized computer systems having any type or configuration of virtualization software.

Moreover, FIG. 1 shows virtual machine monitors 136, 138 that appear as separate entities from other components of the virtualization software. Furthermore, some software components used to implement one embodiment of the invention may be within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software, and even in systems that provide specific hardware support for virtualization.

The various virtualized hardware components in the VM 102, such as the virtual CPU(s) 120-124, the virtual memory 126, the virtual disk 128, and the virtual device(s) 130, are shown as being part of the VM 102 for the sake of conceptual simplicity. In actuality, these "components" are usually implemented as software emulations 140 included in the VMM 136. One advantage of such an arrangement is that the VMM 136 may (but need not) be set up to expose "generic" devices, which facilitate VM migration and hardware platform-independence.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS 132 (in particular, its kernel) is specifically designed to support such an interface. According to this view, having, for example, an off-the-shelf version of Microsoft Windows XP as the guest OS 132 would not be consistent with the notion of para-virtualization. Others define para-virtualization more broadly to include any guest OS 132 with any code that is specifically intended to provide information directly to any other component of the virtualization software. According to this view, loading a module such as a driver designed to communicate with other virtualization components renders the system para-virtualized, even if the guest OS 132 as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

As illustrated in FIG. 1, in many cases, it may be beneficial to deploy VMMs 136, 138 on top of a software layer—a kernel 142—constructed specifically to provide efficient support for the VMs 102, 104. This configuration is frequently referred to as being "non-hosted." Compared with a system in which VMMs 136, 138 run directly on the hardware platform 106, use of a kernel 142 offers greater modularity and facilitates provision of services (for example, resource management) that extend across multiple virtual machines. Compared with a hosted deployment, a kernel 142 may offer greater performance because it can be co-developed with the VMM 136, 138 and be optimized for the characteristics of a workload consisting primarily of VMs/VMMs. The kernel 142 may also handle any other applications running on it that can be separately scheduled, as well as a console operating system that, in some architectures, is used to boot the system and facilitate certain user interactions with the virtualization software.

Note that the kernel 142 is not the same as the kernel that will be within the guest OS 132—as is well known, every operating system has its own kernel. Note also that the kernel 132 is part of the "host" platform of the VM/VMM as defined above even though the configuration shown in FIG. 1 is commonly termed "non-hosted;" moreover, the kernel 142 may be both part of the host and part of the virtualization software or "hypervisor." The difference in terminology is one of perspective and definitions that are still evolving in the art of virtualization.

SUMMARY OF THE INVENTION

Embodiments of the present invention are directed toward storage device virtualization. In one embodiment, a method of accessing a virtual storage device backed by a file on a network attached storage (NAS) device includes translating the small computer system interface (SCSI) command of each I/O request into a corresponding NAS protocol command. In another embodiment, a computing system includes an NAS device adapted to store one or more files, wherein each file backs a corresponding virtual SCSI storage device. A computing device in the system is adapted to run a virtualization layer for emulating SCSI commands utilizing NAS protocol commands to access a given file on the NAS device that is backing a given virtual SCSI storage.

Another embodiment relates to method for controlling access to an emulated block-based storage device configured to receive block-based commands while storing data in a file-based data storage device configured to receive file-level commands and comprising a file system and storage resources to store the data in accordance with the file system. An initial block-based command to access an emulated block-based storage device is received, wherein the emulated block-base storage device is represented by a first file stored in the file-based data storage device. The method then determines whether a second file associated with the first file in the file-based data storage device exists, wherein the second file maintains a lock value for controlling access to the first file. If the second file does not exist, then a third file associated with the first file that maintains a second lock value for controlling access to the first file is generated and the second lock is periodically updated to maintain access to the first file. File level commands to the file-based data storage device that correspond to received block-based commands intended for the emulated block-based storage device can then be transmitted.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Figure 1:
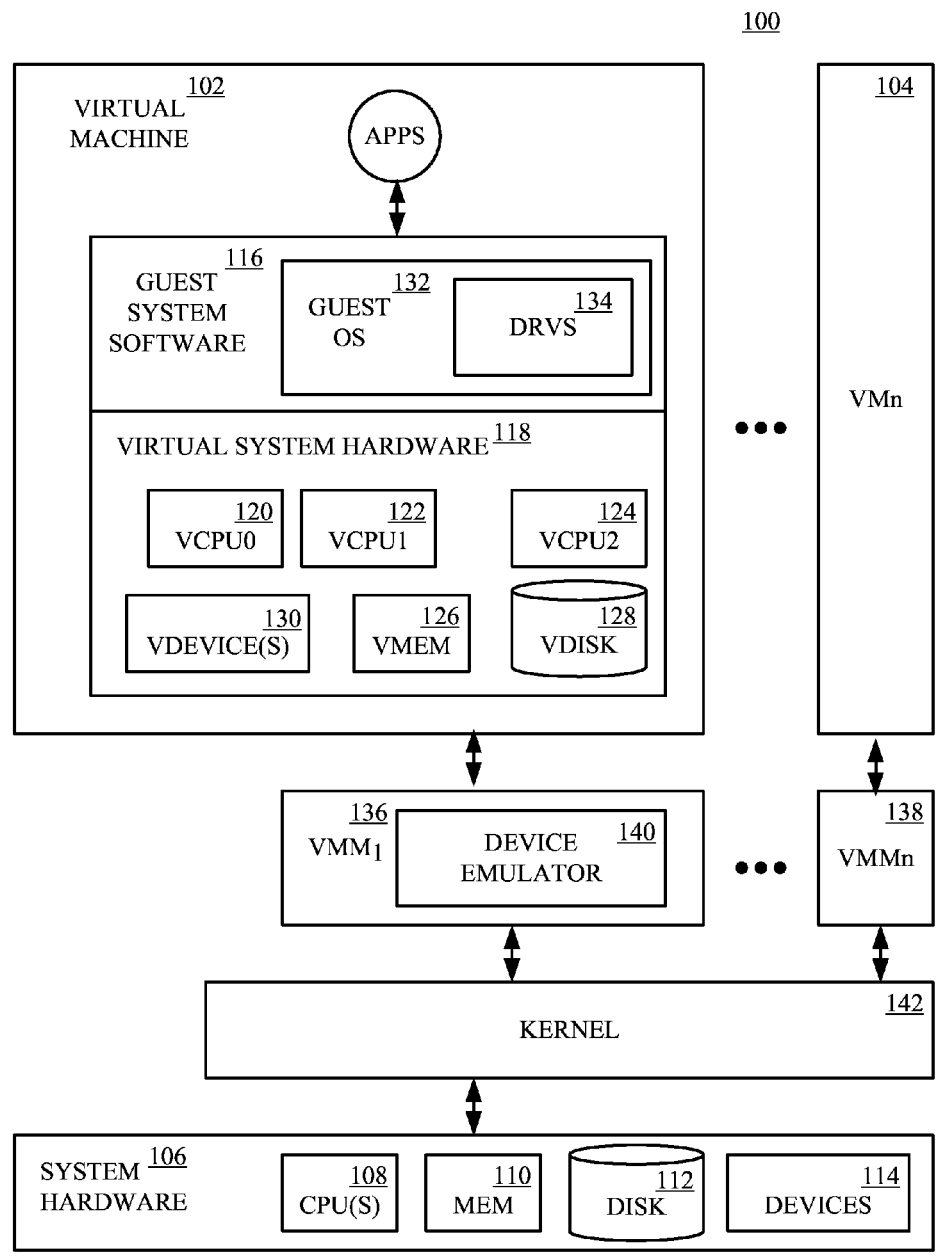
FIG. 1 shows a block diagram of a computer system for implementing virtualization, according to the conventional art.

Reference will now be made in detail to selected embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Embodiments implement a network attached storage (NAS) client in a hosted or non-hosted virtualization architecture as a virtual storage device backend. The virtual storage device backend emulates the small computer system interface (SCSI) protocol to access a file on the NAS device which represents the virtual SCSI storage device. The SCSI read and write commands are mapped to NAS read and write requests which are sent to the NAS device. Extra data structures are also maintained to implement other aspects of the SCSI protocol, such as SCSI aborts, SCSI resets and SCSI reservations. The techniques also enable network problems to be detected. For example, a connection to the NAS server may be re-established transparently without affecting the guest. However, if the network problem is persistent, the guest sees the problem as a SCSI request that does not complete. When the guest attempts to do a SCSI abort or SCSI reset to deal with the problem, such requests are correctly implemented so that the guest can recover from cases where commands never complete.

Embodiments also include a lease-based locking protocol for NAS devices that can enforce either exclusive or shared (e.g., read-only) access to virtual storage devices across multiple servers that are accessing the same NAS volume. A host maintains a lock on a file by repeatedly renewing its lease on the lock within a specified lease time. Even if a host loses its connection to the NAS device, it can be assured that it still has the lock if it re-connects and renews within the lease time. However, the locking protocol allows another host to break the lock, after the lease time has expired, if the host holding the lock has crashed and cannot be restarted.

In the following description, embodiments of the invention are described with reference to the NAS and/or NFS (Network File System protocol). However, it is to be appreciated that the techniques generally apply to any compatible protocol. The NAS and/or NFS specific implementations are described in order to best explain the principles and are not intended to limit the invention to the specific protocols.

Figure 2:
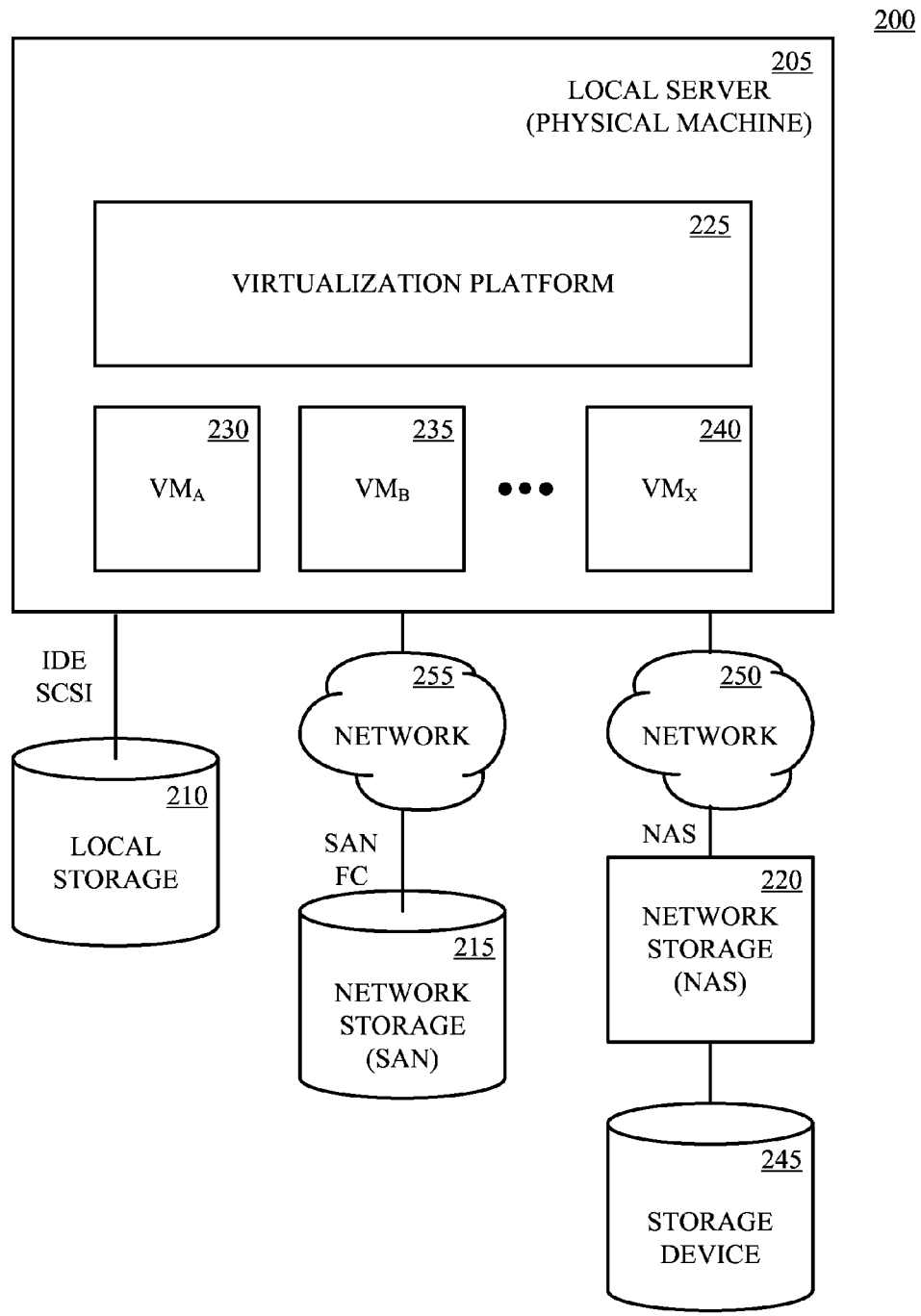
FIG. 2 shows a block diagram of an exemplary distributed computing system for implementing embodiments of the present invention.

Referring to FIG. 2, an exemplary distributed computing system for implementing embodiments of the present invention is shown. The computing system 200 includes a server 205 coupled to a local disk storage 210. The local disk storage 210 is typically coupled to the server 205 by an integrated drive electronics (IDE) communication link, a small computer system interface (SCSI) communication link or the like. The local server 205 is also coupled to one or more network storages 215, 220. The network storages 215, 220 may be a single device, a storage network or array, or the like.

A virtualization platform (e.g., software) 225 is run on one or more of the servers 205. The virtualization software 225 provides a layer of abstraction between the physical computing, storage and networking hardware and the applications running on the computing device. Virtualization may be implemented by a hosted architecture or a hypervisor architecture. The hosted approach provides partitioning and other virtualization services with the assistance of a standard operating system and typically supports a broad range of hardware configurations. The virtualization software relies on the host operating system to provide some of the services to talk directly to the underlying hardware.

In a hypervisor implementation available from VMware of Palo Alto, Calif., the hypervisor is the lowest layer of software installed on a physical computing device (e.g., x86-based computing system). In a typical hypervisor architecture, a thin layer of software implements virtual partitioning and other lower-level virtualization capabilities. The hypervisor layer runs directly on hardware, but underneath software that implements higher-level virtualization services.

In either implementation, the virtualization software 225 can implement multiple virtual machines 230-240, with heterogeneous operating systems and applications, running in isolation, side-by-side on the same physical computing device. A virtual machine 230 is a representation of the physical machine by software. Each virtual machine has its own set of virtual hardware (e.g., central processing unit, random access memory, network interface, hard disk, etc.) upon which an operating system and applications are loaded. The virtual machines may have any number of physical and/or logical virtualized processors, networks and/or storage systems. However, regardless of the actual physical hardware components of the physical computer on which a virtual machine executes, the operating system sees a consistent, normalized set of hardware.

Figure 3:
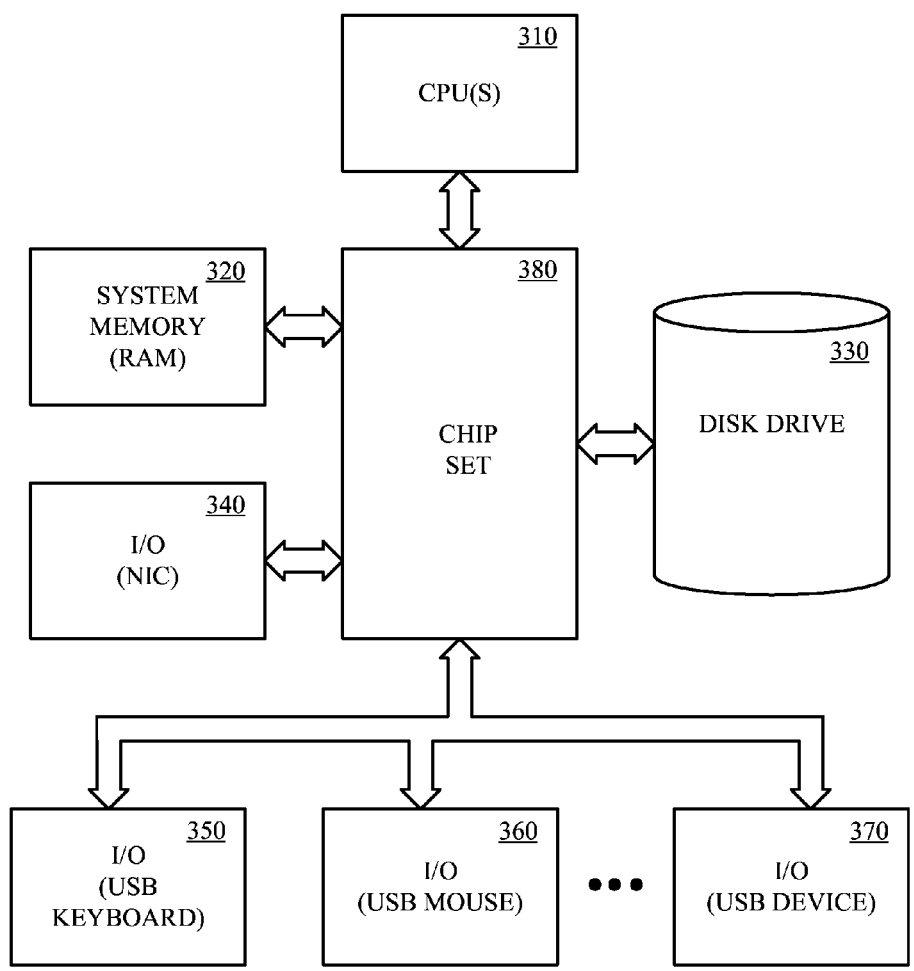
FIG. 3 shows a block diagram of an exemplary physical computing device for implementing embodiments of the present invention.

Referring now to FIG. 3, an exemplary physical computing device 300 for implementing embodiments of the present invention is shown. The computing device 300 may be a local or remote device, such as a personal computer, server computer, client computer, laptop computer, hand-held device, minicomputer, mainframe computer, distributed computer system or the like. The computing device 300 includes one or more processors (e.g., CPU) 310, one or more computing device-readable mediums 320, 330 and one or more input/output (I/O) devices 340, 350, 360, 370. The computing device-readable mediums 320, 330, and I/O devices 340, 350, 360, 370 may be communicatively coupled to the processor 310 by a chip set 380 and one or more busses. The chipset 380 acts as an input/output hub for communicating data and instructions between the processor 310 and the computing device-readable mediums 320, 330, and I/O devices 340, 350, 360, 370.

In one implementation, the one or more processors are x86-based processors. The I/O device 340, 350, 360, 370 may include one or more network interface cards 340, and peripherals such as a keyboard, a pointing device, a monitor, a speaker, a printer, and/or the like. The network interface card 340 provides for access to one or more other computing devices, networks and/or storage devices remote to the computing device 300.

Generally, local storage, such as a magnetic disk and/or optical disk, provides for non-volatile storage of computer-readable instructions and data for use by the computing device 300. For instance, the disk drive 330 may store the virtualization software, a host operating system (OS), one or more guest operating systems, applications and data. The local storage may be an IDE disk, SCSI disk or the like. The system memory (e.g., RAM) 320 provides for volatile storage of computer-readable instructions and data for use by the computing device 300. For instance, the system memory 320 may temporarily store executing portions of the virtualization software, host and/or guest operating systems, one or more applications and associated data that are currently used by the CPU 310.

Referring again to FIG. 2, one or more of the network storage devices 215, 220 are Network Attached Storage (NAS) devices. The NAS device(s) 220 may be communicatively coupled to one or more storage devices 245. The NAS device 220 may couple the storage device 245 to the local server 205 through one or more networks 250. Communication between the local server 205 and the NAS device 220 may be implemented utilizing the Network File System (NFS) protocol, the Common Internet File System (CIFS) protocol, or any other NAS compatible protocol. The communication link between the NAS device 220 and the storage device 245 may be an Ethernet network. Furthermore, the communication between the NAS device 220 and the storage device 245 may be implemented utilizing the SCSI protocol, IDE protocol or the like.

One or more of the network storage devices 215, 220 may also include Storage Area Network (SAN) devices. The SAN device 215 may be directly connected or indirectly connected through one or more networks 255 to the server 205. The communication link to the SAN device 215 may be a fiber channel (FC) network or the like.

Figure 4:
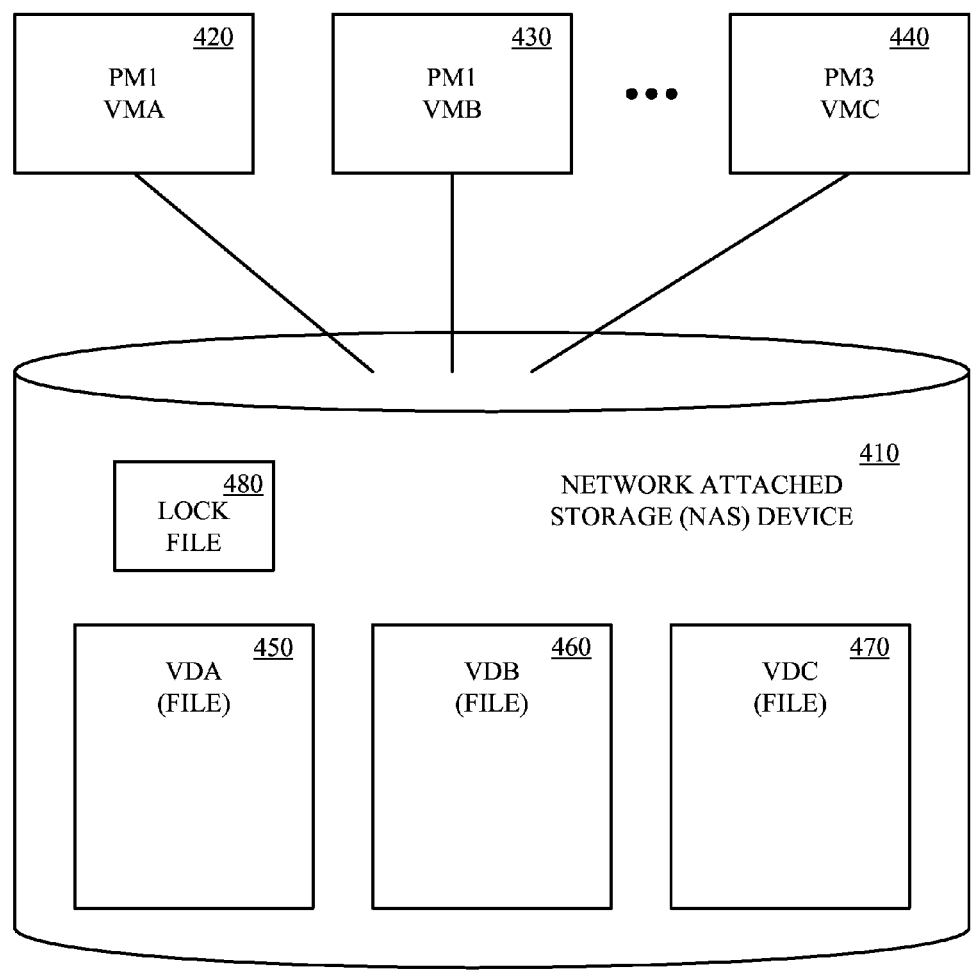
FIG. 4 shows a block diagram of an exemplary virtualized storage environment, in accordance with one embodiment of the present invention.

Referring now to FIG. 4, an exemplary virtualized storage environment 400, in accordance with one embodiment of the present invention, is shown. Virtualization of the storage devices enables sharing of storage networks and arrays to meet various data center storage needs. Sharing the storage networks and arrays between groups of servers via virtualized storage area networks allows aggregation of the storage resources and provides more flexibility in provisioning them to virtual machines. Virtualization of storage also provides multiple methods for improving data availability, including multipathing, clustering, array-based snapshot and replication techniques via raw device mapping, virtual machine mobility, software-based virtual machine disk snapshots for disaster recovery, and the like.

The virtualized storage environment 400 includes a NAS device 410 coupled to one or more virtual machines 420-440 implemented on one or more physical machines. The NAS device 410 may include an individual disk, a network of disks, an array of disks, or the like. A virtual SCSI storage device for each virtual machine may be implemented by a file 450-470 stored on the NAS device 410.

The NAS device 410 is a NAS server with attached storage that may be a SCSI disk, an IDE disk, or the like. The NAS device 410 exports a file system (e.g., stores and manages files), and the virtualization software emulates a SCSI card and maps SCSI commands to NFS or CIFS commands for accessing a file backing a virtual SCSI storage device on the NAS device 410. In the following description, the techniques are described specifically with respect to NFS, but it can be applied to any other NAS protocol, including CIFS.

Generally, when accessing a corresponding physical storage device, SCSI has lots of commands, including read and write. NFS, in contrast has fewer commands, but does include read and write. Therefore, the SCSI read command is mapped to one or more NFS read commands. Similarly, the SCSI write command is mapped to one or more NFS write commands. SCSI read and write commands may be mapped to multiple NFS read and write commands based on things like the maximum supported transfer size and other criteria. When translating the SCSI read and write commands to NFS read and write commands, the memory address and disk address are also transformed. The resulting NFS request is then output on the communication link.

The NFS protocol, however, does not have an abort or reset command. To implement the SCSI abort and reset commands, the virtualization software keeps track of all SCSI requests. In one implementation, the I/O requests are kept track of in a virtual SCSI request list. Each SCSI request in the virtual SCSI request list has a unique tag that identifies it. The virtual SCSI request list may be a fully associative data structure. The tag may be generated utilizing a hash function. A virtual SCSI request list may be provided for each virtual machine or a virtual SCSI request list may be provided for all virtual machines. In a single list implementation, the tag for each SCSI request is unique across all virtual machines on each physical machine.

When a reply to a given read or write request is received, the tag contained in the reply is utilized to lookup the request in the virtual SCSI request list. The tag is used to find an associated structure, which contains the original SCSI request and information about which VM actually issued the original I/O. If a request corresponding to the reply is found, the given request is removed from the list. The NFS reply is then translated to a virtual SCSI reply. For example, if the request is a read, the data is copied into the virtual machine's memory and a virtual interrupt is sent to the virtual machine. If the tag included in the reply is not found in the virtual SCSI request list, then the results of the reply are dropped.

The virtualization software emulates the SCSI abort command for a virtual storage device stored on an NFS device by removing the corresponding request from the information maintained by the virtualization software about pending I/O requests. If the command is still in flight, the command is "removed" from the information, maintained by the virtualization software, by marking that the command was completed such that the guest finds out that the command was actually aborted. In one implementation, the corresponding request is removed from the virtual SCSI request list. Therefore, if the results come back for a given request that has been removed from the virtual SCSI request list, the result of the reply is ignored (e.g., dropped) thereby emulating a virtual SCSI abort command.

A reset may be issued on a virtual SCSI adapter. The reset command is handled by the virtualization layer by aborting any outstanding SCSI request that was issued on the virtual SCSI storage device that reset. The virtualization software emulates the SCSI reset by removing all requests, from the given virtual machine, from the information maintained by the virtualization software. If commands are still in flight, the commands are "removed" from the information, maintained by the virtualization software, by marking that the commands were completed such that the guest finds out that the commands were actually aborted. In one implementation, all pending I/O requests (which represent all outstanding virtual SCSI requests) from a given virtual machine are removed from the virtual SCSI request list. Therefore, any results that come back for any of those outstanding requests that have been removed will be ignored, thereby emulating a virtual SCSI reset command.

The virtualization software may also emulate the SCSI reserve and SCSI release commands by utilizing NFS file access permissions. In particular, the virtualization software generally reads and writes to the virtual SCSI storage device backend (i.e. the physical storage device used for the emulation of the virtual SCSI storage device) as an owner identified by a specific identifier. The SCSI reserve command may be implemented by changing the ownership (e.g., permission) for the virtual SCSI storage device backend from a first identifier to a second identifier for a given virtual machine requesting a reservation. The virtualization software then utilizes the second identifier for accesses to the virtual SCSI storage device backend by the given virtual machine. Other virtual machines in a virtual cluster accessing the same virtual SCSI storage device will still attempt to access the virtual SCSI storage device using the first identifier, and will therefore immediately have all input/outputs (I/O) fail, receiving a permission error. The virtual disk emulation code will properly interpret the permission error as an indication that there is a virtual SCSI reservation conflict. The SCSI release command may be implemented by the virtualization software changing the ownership for the virtual SCSI storage device backend from the second identifier back to the first identifier upon receipt of a SCSI release command from the given virtual machine.

SCSI commands that request metadata from the virtual SCSI storage device backed by a file on a NAS device may be emulated by the virtualized software. For example, in response to an inquiry about what kind of disk is present, a response containing a virtual device identifier (e.g., Make: VMware) and size of the virtual disk (e.g., size of virtual partition) can be returned directly by the virtualization software. Thus, the inquiry may be directly emulated by the virtualization software without an input/output. In another example, a get_capacity command, which is used to determine the size of the file representing the virtual SCSI storage device, can be emulated by a request to get the attributes of the file backing the virtual SCSI storage device.

The virtualization software may also provide a distributed file locking protocol. The lock file 480 is utilized to prevent simultaneous access, to the file backing the virtual storage device, by multiple virtual machines on multiple physical machines 420-440. In particular, the virtualization software creates a lock file 480 for the file backing the given virtual SCSI storage device 450. The virtualization software then periodically updates a counter in the lease-based lock file to maintain a lock on the file backing the given virtual storage device 450. The virtualization software on other hosts may check the lock file 480 to determine if the file backing the virtual storage device 450 is locked and if the lease has expired when the virtualization software intends to power on a virtual machine that accesses the same virtual storage device.

In one implementation, the lease-based locking file may be utilized to enforce exclusive access to the given virtual storage device 450. In another implementation, the lease-based locking file may enable a shared read-only access by multiple virtual machines 430, 440. To create a shared mode lock file, the virtualization software creates a lock file and sets the mode of access therein on behalf of a first virtual machine 430. If virtualization software wants to access the virtual storage device 450 in shared mode on behalf of a second virtual machine 450, the virtualization software checks the mode in the lock file 480. If the mode is already shared mode, then any number of other virtual machines 420-440 can join in shared read-only access to the virtual storage device 450. All the shared readers update the lease on the lock. As long as any virtual machine with shared access is alive, the counter in the lock file 480 will be updated and the virtual storage device 450 will be accessible only in shared mode. The shared mode can be broken and converted to exclusive mode when the lease counter is not being updated on behalf of any virtual machines.

The techniques for emulating the SCSI protocol for a virtual storage device backed by a file stored on NAS servers may be implemented in a hosted or non-hosted (e.g., hypervisor) virtualized computer system, utilizing any number of degrees of virtualization. Generally, the techniques for emulating the SCSI protocol are implemented in software. Accordingly, the techniques may be embodied in one or more computing device-readable mediums having instructions which when executed cause one or more processors to emulate the small computing system interface (SCSI) protocol for accessing a virtual SCSI storage device backed by a file stored on a network attached storage (NAS) device. However, in other implementations, it may be possible to implement the techniques wholly or partially in hardware, firmware or the like. For example, the SCSI protocol emulation for virtual SCSI storage devices backed by files stored on NAS servers may be implemented in a computing device platform that provides hardware support for virtual machines.

Figure 5:
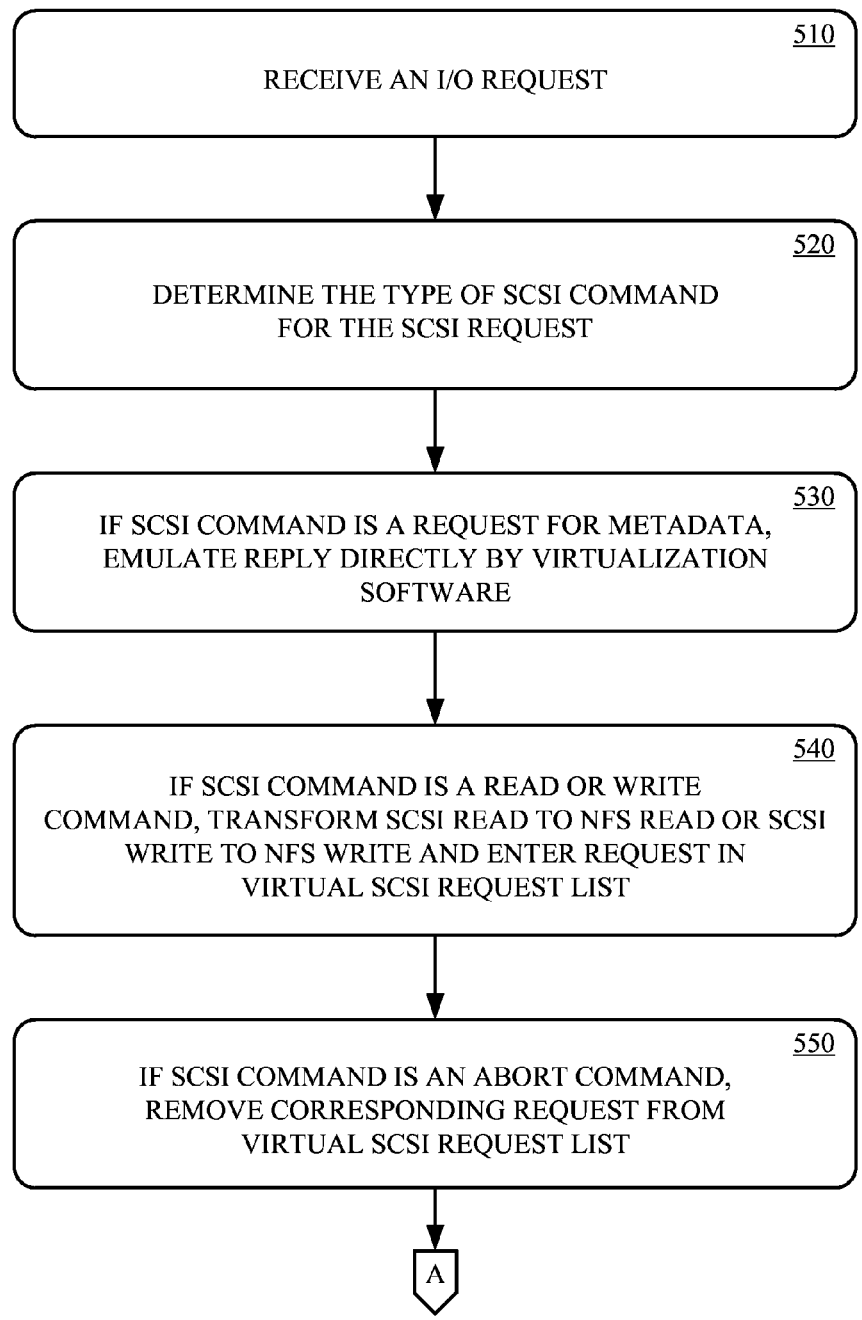
FIGS. 5 and 6 show a flow diagram of a method of accessing a file backing a virtual SCSI storage device on a network attached storage (NAS) device, in accordance with one embodiment of the present invention.
Figure 6:
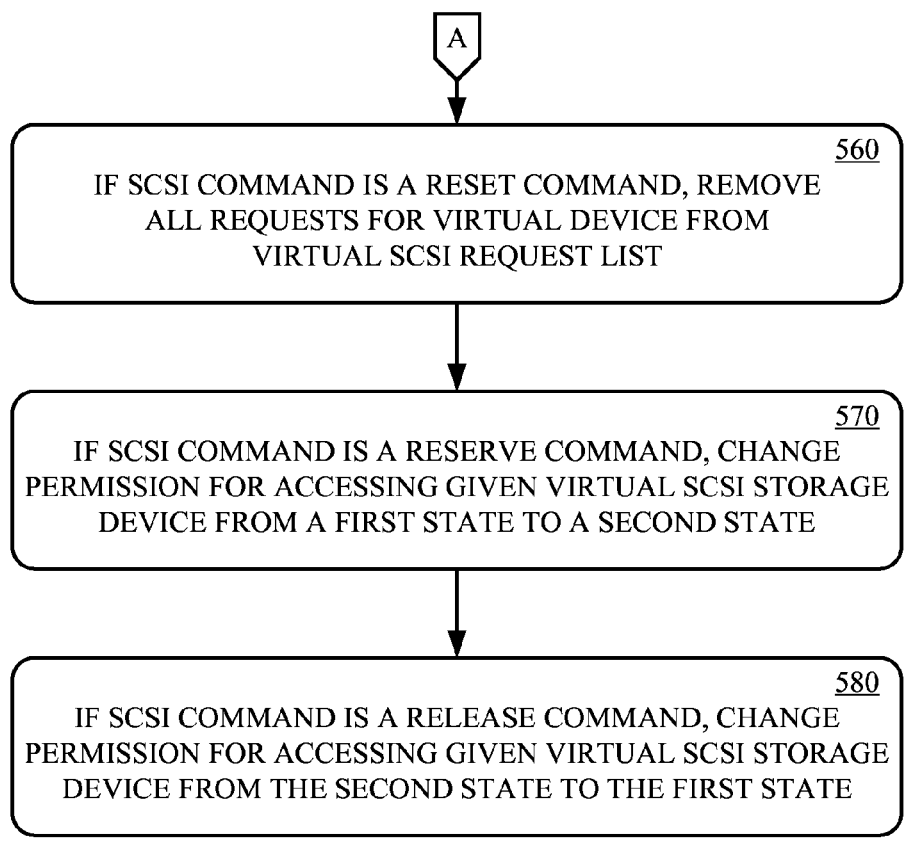

Referring now to FIGS. 5 and 6, a method of accessing a virtual storage device on a network attached storage (NAS) device, in accordance with one embodiment of the present invention, is shown. In the described embodiment, the NAS device is described with reference to the NFS protocol and/or CIFS protocol. However, other embodiments may be implemented using any NAS compatible protocol. The method includes emulating the small computing system interface (SCSI) protocol to access virtual SCSI storage devices backed by files stored on a network attached storage (NAS) device. In one implementation, the NAS client may be augmented with code and data structures necessary to emulate SCSI commands from virtual machines that are accessing virtual SCSI storage devices on a NAS volume. In another implementation, the logic to convert from SCSI to NAS can be a separate piece of logic.

As depicted in FIG. 5, the method begins with receiving virtual SCSI requests, at 510. At 520, the type of SCSI command is determined for each SCSI request received. If the virtual SCSI command is a request for metadata from the file backing the virtual SCSI storage device, a virtual SCSI reply may be emulated by the virtualization software, at 530. If the virtual SCSI command is a read or write command, the SCSI read is transformed into a NFS or CIFS read or the SCSI write is transformed into a NFS or CIFS write. In addition, information about the I/O request is maintained by the virtualization layer, at 540. In one implementation, information about the I/O request is entered in a virtual SCSI request list.

One difficulty in emulating SCSI commands involves emulating SCSI aborts and resets. For a SCSI abort command, a corresponding request is deleted from the information maintained by the virtualization layer about pending I/O requests, at 550. In one implementation, the corresponding request is removed from the virtual SCSI request list. Referring now to FIG. 6, if the virtual SCSI command is a reset command, all requests from the virtual device are deleted from the information maintained by the virtualization layer, at 560. In one implementation, all requests from the virtual device of a virtual machine submitting the reset request are removed from the virtual SCSI request list. When the command is removed from the list, the request is also completed with a status indicating that it was successfully aborted.

Accordingly, a faithful emulation of SCSI aborts and resets, where the guest OS has total control over which commands are aborted and retried can be achieved by keeping a virtual SCSI request list of outstanding requests that have been sent to the NFS server. When the response to a request comes back, an attempt is made to find a matching request in the virtual SCSI request list. If successful, the matching request is removed from the list and the result of the response is returned to the virtual machine. If a matching request is not found in the virtual SCSI request list, the results are thrown away, dropped, ignored or the like.

If the virtual SCSI command is a reserve command, the access permission for a given virtual disk file is changed from a first state to a second state, at 570. In particular, the permission on the file backing the virtual SCSI storage device is utilized to implement a reservation. The virtual data storage device is generally accessed using a "usual" user identifier that has permission to access the file backing the virtual data storage device. When a particular virtual machine on a particular host wants to create a virtual SCSI reservation, the permission on the file is changed atomically so that the file can only be accessed with a "special reservation" user identifier, and cannot be accessed anymore by the "usual" user identifier. Therefore, I/O requests, by other virtual machines on the same host or virtual machines on other hosts, to the virtual SCSI storage device are immediately failed if there is a SCSI reservation on the virtual SCSI storage device. The I/O requests to the virtual SCSI storage device fail because NFS inputs and outputs fail due to permission errors.

If the virtual SCSI command is a release command, the permission for accessing the file backing the given virtual SCSI storage device is changed from the second state to the first state, at 580. Therefore, when the virtual SCSI storage device reservation is released or broken, the permissions on the file backing the virtual storage device are restored to the "usual" user identifier.

Figure 7:
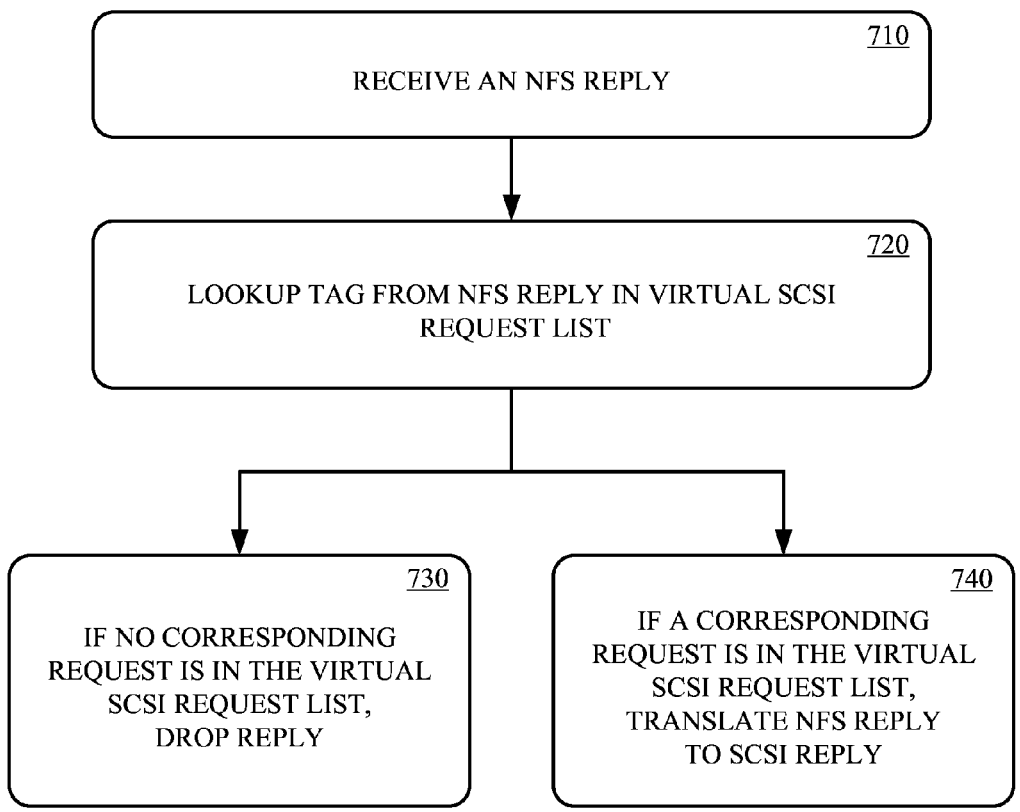
FIG. 7 shows a flow diagram of a method of accessing a file backing a virtual SCSI storage device on a network attached storage (NAS) device, in accordance with another embodiment of the present invention.

Referring now to FIG. 7, a method of accessing a virtual SCSI storage device backed by a file on a network attached storage (NAS) device, in accordance with another embodiment of the present invention, is shown. As depicted in FIG. 7, the method begins with receiving an NFS reply, at 710. At 720, the tag included in the NFS reply is checked against the information maintained by the virtual layer about pending I/O requests. In one implementation, the tag is checked against entries in a virtual SCSI request list. If the tag received in the reply does not provide a match with an entry in the virtual SCSI request list, the reply is dropped, at 730. If a corresponding request is in the virtual SCSI request list, the NFS reply is translated to a virtual SCSI reply, at 740.

The method of accessing a virtual storage device on a network attached storage (NAS) device may be implemented by a NFS client module. In one implementation a NFS client module may be added to the hypervisor (e.g., virtual machine kernel). The NFS client implements the NFS protocol. For example, the NFS client can request a mount of a NFS volume from a NFS server, and then make all the usual NFS requests to the server. A TCP/IP stack can be added to provide the network transport to the NFS client. The TCP/IP stack may connect to a virtual switch, which provides external networking connectivity to the NFS server.

The TCP/IP networks present different characteristics from what a SCSI configuration presents. For instance, there are more transient connectivity issues in the underlying IP networks. As described above, lost requests or replies are dealt with by emulation of SCSI aborts and resets. The guest OS in the virtual machine can abort SCSI commands that do not return a status within a given time. In addition, TCP socket connections, that have been closed because of network connectivity problems or that were explicitly closed by the NAS server because of idleness, may be restored transparently. If the socket is successfully re-opened, pending requests to the NAS server can be re-queued for sending again. If the network connectivity problems last for a while and the socket cannot be re-opened for a while, then the guest can do SCSI aborts and/or resets, as described above. For the guest, it will look like it has lost connection to its virtual SCSI storage device, which the guest should be able to deal with. However, if the networking problems are actually caused by a bad NIC or bad connection to a switch, then any existing NIC teaming capability of the local server may be able to deal with the problem without any loss of connectivity.

Accordingly, embodiments of the present invention may transparently and reliably boot and run virtual machines whose virtual SCSI storage devices are backed by files stored on NAS volumes. Embodiments may advantageously map virtual SCSI commands into appropriate requests to a NAS server. For example, virtual SCSI read and write commands are mapped to NFS or CIFS read and write commands. Embodiments may also advantageously handle transient or permanent network problems in talking to the NAS server. For example, a virtual SCSI request list may be leveraged to implement virtual SCSI abort and reset commands when a network problem is detected.

Figure 8:
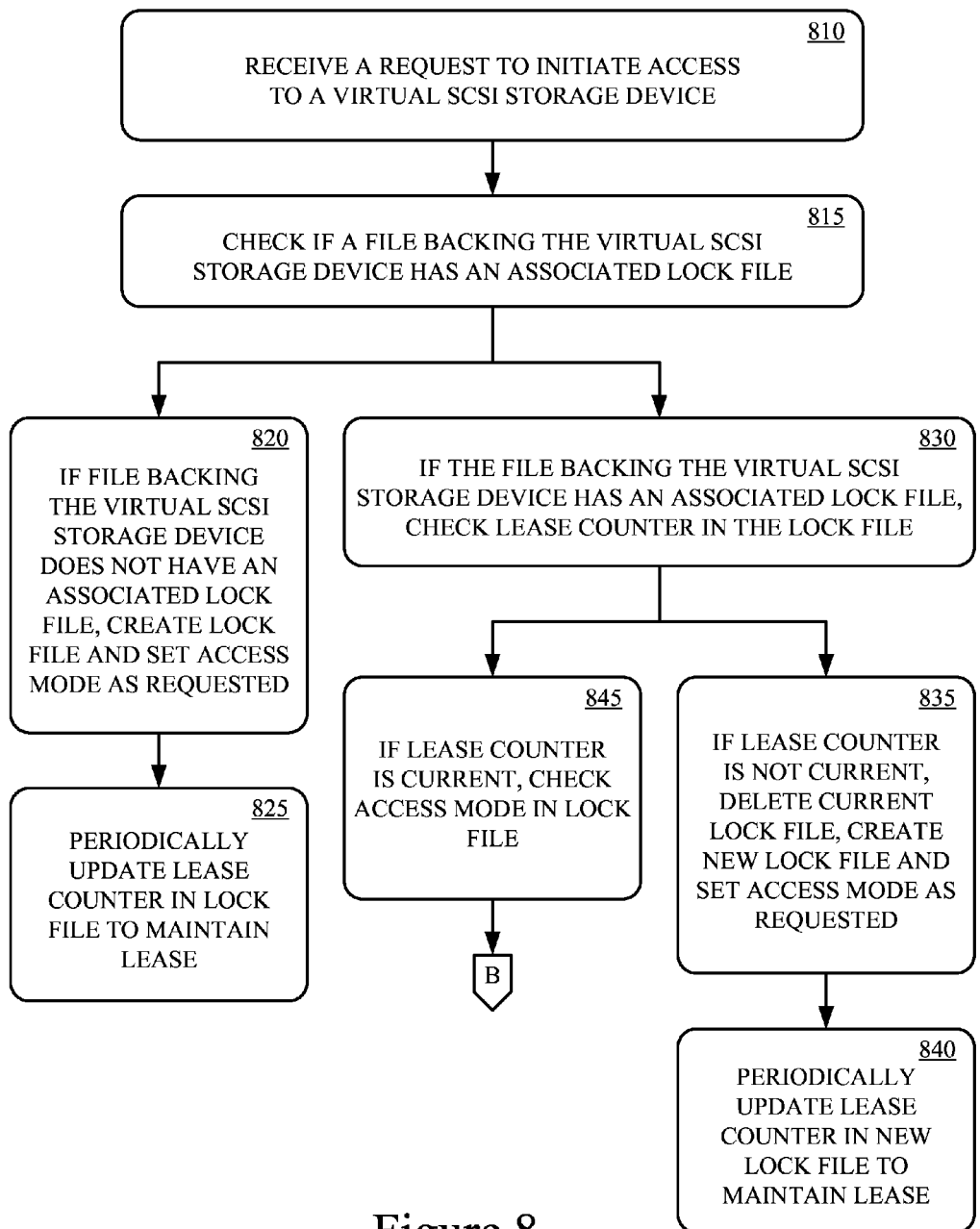
FIGS. 8 and 9 show a flow diagram of a method of creating and using a lock file, in accordance with one embodiment of the present invention.
Figure 9:
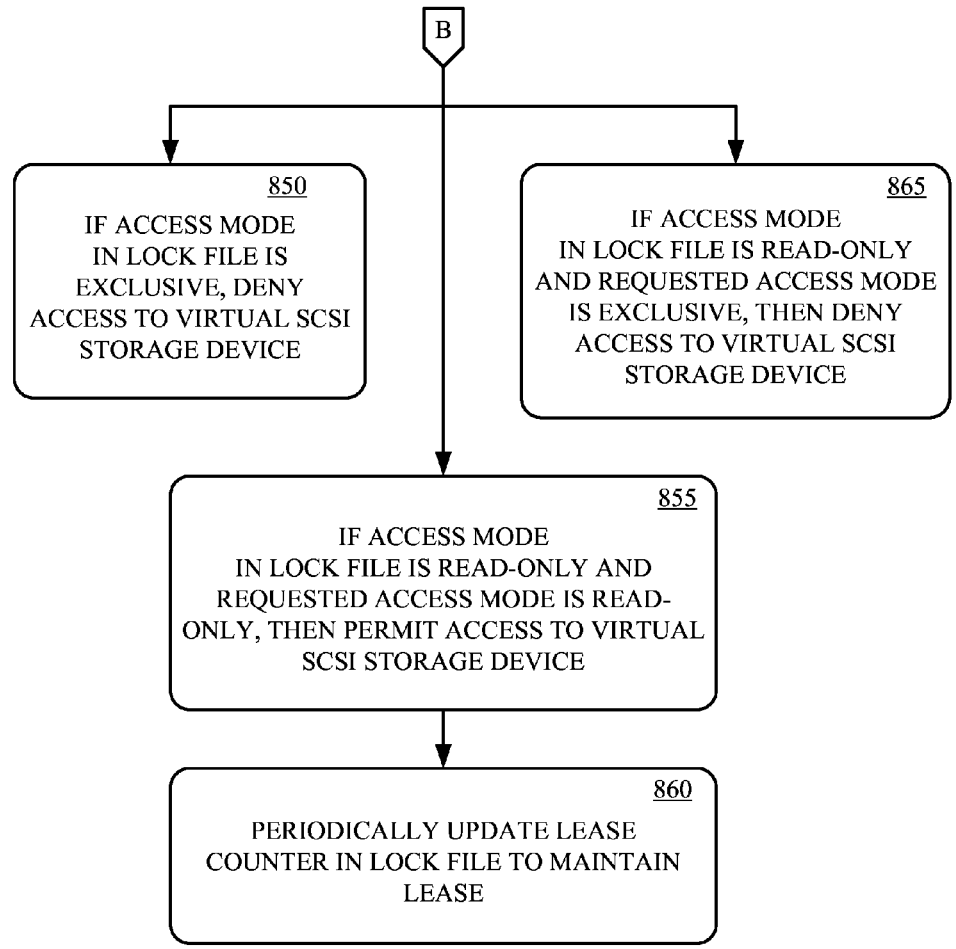

Virtual storage devices are preferably also protected against improper simultaneous access by multiple virtual machines on one or more physical machines. Therefore, a locking mechanism for files stored on a NAS device is preferably provided that can enforce either exclusive access to the file backing a virtual storage device or shared, read-only access to the file backing a virtual storage device. Referring now to FIGS. 8 and 9, a method of creating and using a lock file, in accordance with one embodiment of the present invention, is shown. Assume that a virtual SCSI storage device already exists in the sense that a virtual disk file backing the virtual storage device already exists. The method of FIGS. 8 and 9 is performed when a virtual machine attempts to access the virtual SCSI storage device, such as when the virtual machine is powered on. In this situation, the virtual SCSI storage device may, or may not, already be in use by another virtual machine.

The method of FIGS. 8 and 9 begins, at 810, with receiving a request to initiate access to the virtual SCSI storage device, such as when a virtual machine is powered on. Initiating access to the virtual SCSI storage device corresponds to opening a file on a NAS that backs the virtual SCSI storage device. The file backing the virtual SCSI storage device may be opened in either "exclusive" mode (e.g., use by a single virtual machine) or "read-only" mode (sharing of the device among several virtual machines). The mode is specified in the request to initiate access to the virtual SCSI storage device.

At 815, a NAS device is checked to determine if the file backing the virtual SCSI storage device has an associated lock file. If the file backing the virtual SCSI storage device does not have an associated lock file, a lock file is atomically created and the access mode attribute in the lock file is set as requested, at 820. The lock file may be a metadata file that includes a lease attribute and an access mode attribute. The lease attribute in the lock file, created at process 820, is then periodically updated by the host to maintain the lease, at 825.

The lease attribute in the lock file may be utilized to implement a lease counter. As long as the lease counter is updated the lease is maintained.

If the file backing the virtual SCSI storage device has an associated lock file, the lease attribute in the lock file is checked to determine if the lease is current, at 830. One method of determining if the lease is current is to read the current value of the lease counter, wait a specified amount of time that is greater than the periodic update time of the lease, and then read the value of the counter again. If the lease counter has not changed, then no other host is currently maintaining the lease. If the lease is not currently maintained than the lock may be broken as described below. Other methods of determining if the lease is current are possible if the hosts involved in the locking have some global notion of time.

If the lease is not current, the existing lock file is deleted and a new lock file is created, at 835. When the new lock file is created the access mode attribute in the lock file is set according to the requested mode. The lease attribute in the new lock file, created at process 835, is then periodically updated by the host to maintain the lease, at 840.

If the lease is current, the access mode attribute in the lock file is checked, at 845. At 850, access to the virtual SCSI storage device is denied if the access mode attribute in the lock file is set to exclusive. If the access mode attribute in the lock file is set to read-only and the requested access mode is read-only, access to the virtual SCSI storage device is permitted, at 855. At 860, the lease attribute in the lock file is periodically updated by the host to maintain the lease when access is permitted at process 855. Thus, if another host wants to access a virtual disk file in shared mode, it can check the access mode attribute in the lock file. If the mode is already read-only mode (e.g., shared mode), then any number of other hosts can join in shared access to the file backing the virtual SCSI storage device. All such hosts will continue to maintain the lease by updating the counter in the lock file. Hence, as long as any host with shared access is alive, the lease counter will be updated and the file will be accessible only in shared mode. The read-only mode can be broken and converted to exclusive mode when no hosts are still updating the lease. At 865, access to the virtual SCSI storage device is denied, if the access mode attribute in the lock file is set to read-only and the requested access mode is exclusive.

The locking technique can ensure that users cannot power on the same virtual machine simultaneously on different physical servers. However, the locking method allows users to power on multiple virtual machines that share the same virtual SCSI storage device in non-persistent (e.g., snapshot) mode. The locking method also advantageously overcomes a deficiency that the conventional network lock manager (NLM) presents, which is that another server cannot break a lock unless the server that held the lock before crashing is able to reboot and run a recover process.

The above techniques are described with reference to the NAS and/or NFS. However, it is to be appreciated that embodiments of the present invention may be practiced with any compatible protocol. The NAS and/or NFS specific implementations are described in order to best explain the principles of virtualizing a SCSI storage device and are not intended to limit the invention to the specific protocols.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for controlling access to an emulated block-based storage device configured to receive block-based commands while storing data in a file-based data storage device configured to receive file-level commands and comprising a file system and storage resources to store the data in accordance with the file system, the method comprising:
receiving an initial block-based command to access an emulated block-based storage device, wherein the emulated block-base storage device is represented by a first file stored in the file-based data storage device;
determining whether a second file associated with the first file exists in the file-based data storage device, wherein the second file maintains a first lock value for controlling access to the first file;
if the second file exists, assessing whether the first lock value is being updated by another entity, denying access to the first file if the first lock value is being updated by the other entity, and accessing the first file by deleting the second file and creating a third file in the file-based data storage device if the first lock value is not being updated by the other entity, wherein the third file maintains a second lock value for controlling access to the first file and periodically updating the second lock value to maintain access to the first file; and
transmitting file level commands to the file-based data storage device corresponding to received block-based commands intended for the emulated block-based storage device.

2. The method of claim 1, further comprising:
if the second file does not exist, creating a third file in the file based storage device that maintains a second lock value for controlling access to the first file and periodically updating the second lock value to maintain access to the first file.

3. The method of claim 1, wherein assessing whether the first lock value is being updated by another entity comprises waiting for a specified period of time and reading the first lock value to determine whether the other entity has changed the first lock value.

4. The method of claim 1, wherein the second file further comprises an attribute value that indicates whether the first file can be simultaneously accessed by multiple entities or only by a single entity.

5. The method of claim 1, wherein initial block-based command is issued by a virtual machine during a powering on of the virtual machine.

6. The method of claim 1, wherein the emulated block-based storage device emulates a Storage Attached Network (SAN) device utilizing Small Computer System Interface (SCSI) commands and the file-based data storage device is a Network Attached Storage (NAS) device.

7. A computer system configured to control access to an emulated block-based storage device configured to receive block-based commands while storing data in a file-based data storage device configured to receive file-level commands and comprising a file system and storage resources to store the data in accordance with the file system, the computer system comprising a processor configured to perform the steps of:
receiving an initial block-based command to access an emulated block-based storage device, wherein the emulated block-base storage device is represented by a first file stored in the file-based data storage device;
determining whether a second file associated with the first file exists in the file-based data storage device, wherein the second file maintains a first lock value for controlling access to the first file;
if the second file exists, assessing whether the first lock value is being updated by another entity, denying access to the first file if the first lock value is being updated by the other entity, and accessing the first file by deleting the second file and creating a third file in the file-based data storage device if the first lock value is not being updated by the other entity, wherein the third file maintains a second lock value for controlling access to the first file and periodically updating the second lock value to maintain access to the first file; and
transmitting file level commands to the file-based data storage device corresponding to received block-based commands intended for the emulated block-based storage device.

8. The computer system of claim 7, wherein if the second file does not exist, the processor further performs the steps of:
creating a third file in the file-based data storage device, that maintains a second lock value for controlling access to the first file and periodically updating the second lock value to maintain access to the first file.

9. The computer system of claim 7, wherein assessing whether the first lock value is being updated by another entity comprises waiting for a specified period of time and reading the first lock value to determine whether the other entity has changed the first lock value.

10. The computer system of claim 7, wherein the second file further comprises an attribute value that indicates whether the first file can be simultaneously accessed by multiple entities or only by a single entity.

11. The computer system of claim 7, wherein initial block-based command is issued by a virtual machine during a powering on of the virtual machine.

12. The computer system of claim 7, wherein the emulated block-based storage device emulates a Storage Attached Network (SAN) device utilizing Small Computer System Interface (SCSI) commands and the file-based data storage device is a Network Attached Storage (NAS) device.

13. A non-transitory computer readable storage medium storing instructions for controlling access to an emulated block-based storage device configured to receive block-based commands while storing data in a file-based data storage device configured to receive file-level commands and comprising a file system and storage resources to store the data in accordance with the file system, wherein the instructions, when executed in the computer system, cause the computer system to carry out the steps of:
receiving an initial block-based command to access an emulated block-based storage device, wherein the emulated block-base storage device is represented by a first file stored in the file-based data storage device;
determining whether a second file associated with the first file exists in the file-based data storage device, wherein the second file maintains a first lock value for controlling access to the first file;
if the second file exists, assessing whether the first lock value is being updated by another entity, denying access to the first file if the first lock value is being updated by the other entity, and accessing the first file by deleting the second file and creating a third file in the file-based data storage device if the first lock value is not being updated by the other entity, wherein the third file maintains a second lock value for controlling access to the first file and periodically updating the second lock value to maintain access to the first file; and transmitting file level commands to the file-based data storage device corresponding to received block-based commands intended for the emulated block-based storage device.

14. The non-transitory computer readable storage medium of claim 13, wherein if the second file does not exist, the instructions further perform the steps of: creating a third file in the file-based data storage device, that maintains a second lock value for controlling access to the first file and periodically updating the second lock value to maintain access to the first file.

15. The non-transitory computer readable storage medium of claim 13, wherein assessing whether the first lock value is being updated by another entity comprises waiting for a specified period of time and reading the first lock value to determine whether the other entity has changed the first lock value.

16. The non-transitory computer readable storage medium of claim 13, wherein the second file further comprises an attribute value that indicates whether the first file can be simultaneously accessed by multiple entities or only by a single entity.

17. The non-transitory computer readable storage medium of claim 13, wherein initial block-based command is issued by a virtual machine during a powering on of the virtual machine.

* * * * *